No. 774,576. PATENTED NOV. 8, 1904.
L. B. GARMAN.
BELT HOLDER.
APPLICATION FILED JULY 22, 1903.
NO MODEL.
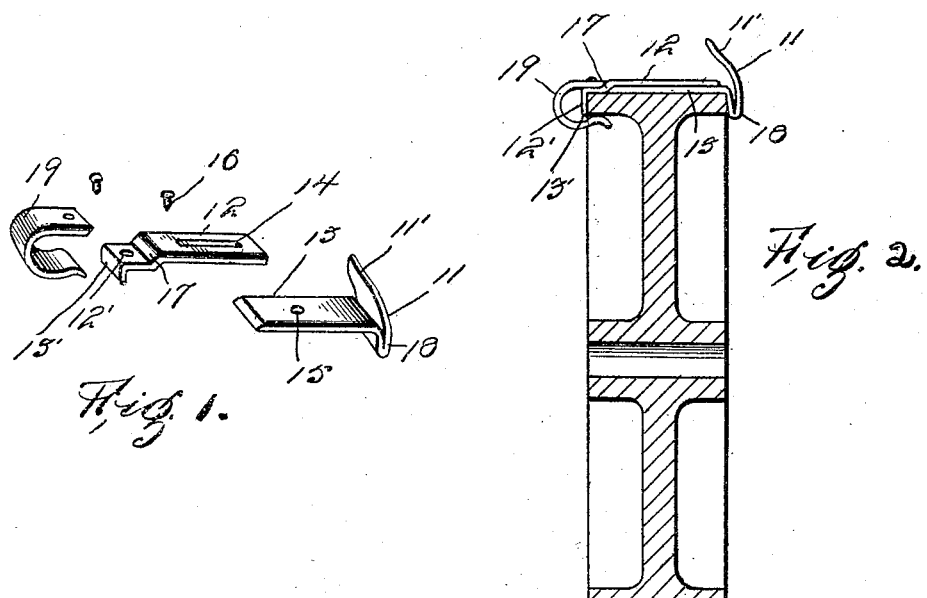
Witnesses
Inventor
L. B. Garman
By
Attorneys No. 774,576. Patented November 8, 1904.

UNITED STATES PATENT OFFICE.

LEWIS B. GARMAN, OF HUNTERTOWN, INDIANA.

BELT-HOLDER.

SPECIFICATION forming part of Letters Patent No. 774,576, dated November 8, 1904.

Application filed July 22, 1903. Serial No. 166,580. (No model.)

*To all whom it may concern:*

Be it known that I, LEWIS B. GARMAN, a citizen of the United States, residing at Huntertown, in the county of Allen, State of Indiana, have invented certain new and useful Improvements in Belt-Holders; and I do hereby declare the following to be a full, clear, and exact description of the invention, such as will enable others skilled in the art to which it appertains to make and use the same.

This invention relates to belt-replacers, and has for its object to provide a device of this nature which will be simple in construction and cheap to manufacture and which may be applied to a belt-wheel to more readily facilitate the application of the belt thereon and which will be adjustable to different sizes of wheels.

In the drawings forming a portion of this specification, and in which like numerals of reference indicate similar parts in both views, Figure 1 is a view of the unassembled parts of the belt-replacer. Fig. 2 is a sectional view of the pulley with the replacer engaged therewith.

Referring now to the drawings, the present device comprises two members 12 and 13, which are formed from strips of malleable iron or similar material. The member 13 is bent at right angles to itself at one end and again upon itself, as shown at 18, and extends in the opposite direction beyond the plate to form a transverse head 11, one side, 11', of which is turned diagonally in the direction of the opposite end of the plate. This plate has a threaded perforation 15 therethrough.

The member 12 is disposed above the member 13 and has a downward bend 17 between its ends. Beyond the bend 17 the plate is again bent to form a second straight portion 12', which lies in the plane parallel with that occupied by the remainder of the member 12. The end 13' of the member is bent at right angles to this second straight portion 12' and forms a depending lug. Secured to the upper face of the portion 12' is the shank of the spring-metal hook 19, which encircles the end portion 18 and lies with its bill adjacent to the under portion of the member 13.

The member 12 has a longitudinal slot therein which registers with the perforation 15, and disposed in the slot and engaged with the perforation is a screw 16. This screw may be operated to clamp the two members in any desired position. In applying the device to a pulley-wheel the hook 10 is engaged with one edge thereof and the portion 18 of the head 11 is disposed against the opposite edge. In this position a belt may be engaged with the wheel and will bear against the portion 11 of the head, which will prevent its slipping from the wheel as the latter is revolved. This arrangement, it will be seen, not only provides for different widths of pulley-wheels, but allows for different thickness of wheel-rims as well.

What is claimed is—

1. The combination with a pulley, of a belt-replacer therefor, said replacer comprising a plate having an offset portion at one of its ends, and a downwardly-directed lug at the end of the offset portion, a spring-hook secured to the upper face of the offset portion and encircling the hook and lying with its bill spaced from the under side of the plate, said offset portion and bill of the hook being engaged over the edge of the pulley, a second plate disposed between the first-named plate and the outer face of the pulley and slidably connected with the first-named plate, the second-named plate having a head at its outer end, one side of said head bearing against the edge of the pulley and the remaining side being turned diagonally in the direction of the opposite end of the plate, said diagonal end being turned to engage the edge of a belt to hold it upon the pulley, and means for holding the two plates in different positions.

2. A belt-replacer comprising a plate having a laterally-directed head at one end thereof, one side of said head projecting at right angles to the plate and the remaining side being directed toward the opposite end of the plate, a second plate disposed upon the first-named plate and slidably connected therewith, said second plate having a lateral offset portion at one of its ends and lying in a plane with the first-named plate, a downwardly-directed lug projecting from the end of the second plate, means for holding the second plate in different positions, and a spring-hook secured to the upper face of the offset portion and lying with its bill spaced from the under face of the offset portion, said hook and the first-named side of the head being adapted to receive the edges of a pulley therebetween.

In testimony whereof I affix my signature in presence of two witnesses.

LEWIS B. GARMAN.

Witnesses:
WILLIAM TANCEY,
K. J. BAUER.